United States Patent
Gledhill

(10) Patent No.: US 10,213,835 B2
(45) Date of Patent: Feb. 26, 2019

(54) POLYCRYSTALLINE DIAMOND COMPACTS HAVING PARTING COMPOUND AND METHODS OF MAKING THE SAME

(71) Applicant: DIAMOND INNOVATIONS, INC., Worthington, OH (US)

(72) Inventor: Andrew Gledhill, Westerville, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 0 days.

(21) Appl. No.: 15/417,639

(22) Filed: Jan. 27, 2017

(65) Prior Publication Data
US 2017/0232521 A1  Aug. 17, 2017

Related U.S. Application Data

(60) Provisional application No. 62/293,466, filed on Feb. 10, 2016.

(51) Int. Cl.
| | | |
|---|---|---|
| *B22F 3/10* | (2006.01) | |
| *B22F 3/14* | (2006.01) | |
| *B22F 3/24* | (2006.01) | |
| *B22F 3/26* | (2006.01) | |
| *B22F 5/00* | (2006.01) | |

(Continued)

(52) U.S. Cl.
CPC .......... *B22F 7/008* (2013.01); *B22F 3/10* (2013.01); *B22F 3/24* (2013.01); *B22F 3/26* (2013.01); *B28B 11/08* (2013.01); *C04B 35/52* (2013.01); *C04B 35/638* (2013.01); *C04B 41/009* (2013.01); *C04B 41/50* (2013.01); *C04B 41/87* (2013.01); *C22C 26/00* (2013.01); *E21B 10/567* (2013.01); *B22F 2003/244* (2013.01); *B22F 2005/001* (2013.01); *B22F 2302/406* (2013.01); *B22F 2998/10* (2013.01); *B22F 2999/00* (2013.01); *C04B 2235/427* (2013.01); *C04B 2235/616* (2013.01); *C04B 2235/85* (2013.01); *C22C 1/1094* (2013.01);

(Continued)

(58) Field of Classification Search
CPC .... B22F 7/008; B22F 3/10; B22F 3/24; B22F 2003/244; C22C 2026/006; E21B 10/567
See application file for complete search history.

(56) References Cited

U.S. PATENT DOCUMENTS

| | | | | |
|---|---|---|---|---|
| 2007/0079994 | A1* | 4/2007 | Middlemiss | ............ C04B 35/52 |
| | | | | 175/426 |
| 2008/0230280 | A1* | 9/2008 | Keshavan | ................. C22C 1/05 |
| | | | | 175/434 |

(Continued)

FOREIGN PATENT DOCUMENTS

| | | |
|---|---|---|
| WO | 2010128492 A1 | 11/2010 |
| WO | 2012170970 A2 | 12/2012 |

*Primary Examiner* — Pegah Parvini

(57) ABSTRACT

Polycrystalline diamond compacts having parting compound within the interstitial volumes are disclosed herein. In one embodiment, a polycrystalline diamond compact includes a polycrystalline diamond body having a plurality of diamond grains bonded together in diamond-to-diamond bonds, interstitial volumes positioned between the adjacent diamond grains, and a parting compound positioned in at least a portion of the interstitial volumes of the polycrystalline diamond body.

5 Claims, 2 Drawing Sheets

(51) Int. Cl.
  *B22F 7/00*      (2006.01)
  *B22F 7/06*      (2006.01)
  *B28B 11/08*     (2006.01)
  *E21B 10/567*    (2006.01)
  *C22C 26/00*     (2006.01)
  *C04B 35/52*     (2006.01)
  *C04B 35/638*    (2006.01)
  *C04B 41/00*     (2006.01)
  *C04B 41/50*     (2006.01)
  *C04B 41/87*     (2006.01)
  *C22C 1/10*      (2006.01)

(52) U.S. Cl.
  CPC .. *C22C 2026/006* (2013.01); *C22C 2026/007* (2013.01); *C22C 2026/008* (2013.01)

(56) References Cited

U.S. PATENT DOCUMENTS

| | | |
|---|---|---|
| 2011/0023375 A1 | 2/2011 | Sani et al. |
| 2012/0111642 A1 | 5/2012 | Digiovanni |
| 2013/0092452 A1 | 4/2013 | Mukhopadhyay et al. |
| 2015/0367482 A1 | 12/2015 | Gledhill et al. |

* cited by examiner

POLYCRYSTALLINE DIAMOND COMPACTS HAVING PARTING COMPOUND AND METHODS OF MAKING THE SAME

CROSS-REFERENCE TO RELATED APPLICATIONS

None.

TECHNICAL FIELD AND INDUSTRIAL APPLICABILITY

The present disclosure relates generally to polycrystalline diamond compacts and, more particularly, to polycrystalline diamond compacts including a polycrystalline diamond compact having a non-catalytic material addition and a parting compound, and methods of making the same.

BACKGROUND

Polycrystalline diamond ("PCD") compacts are used in a variety of mechanical applications, for example in material removal operations, as bearing surfaces, and in in wire-draw operations. PCD compacts are often used in the petroleum industry in the removal of material in downhole drilling. The PCD compacts are often formed as cutting elements, a number of which are attached to drill bits, for example, roller-cone drill bits and fixed-cutter drill bits.

PCD compacts typically include a superabrasive diamond layer, referred to as a polycrystalline diamond body that is attached to a substrate. The polycrystalline diamond body may be formed in a high pressure high temperature (HPHT) process, in which diamond grains are held at pressures and temperatures at which the diamond particles bond to one another.

As is conventionally known, the diamond particles are introduced to the HPHT process in the presence of a catalyst material that, when subjected to the conditions of the HPHT process, promotes formation of inter-diamond bonds. The catalyst material may be embedded in a support substrate, for example, a cemented tungsten carbide substrate having cobalt. The catalyst material may infiltrate the diamond particles from the support substrate. Following the HPHT process, the diamond particles may be sintered to one another and attached to the support substrate.

While the catalyst material promotes formation of the inter-diamond bonds during the HPHT process, the presence of the catalyst material in the sintered diamond body after the completion of the HPHT process may also reduce the stability of the polycrystalline diamond body at elevated temperatures. Some of the diamond grains may undergo a back-conversion to a softer non-diamond form of carbon (for example, graphite or amorphous carbon) at elevated temperatures. Further, mismatch of the coefficients of thermal expansion may induce stress into the diamond lattice causing microcracks in the diamond body. Back-conversion of diamond and stress induced by the mismatch of coefficients of thermal expansion may contribute to a decrease in the toughness, abrasion resistance, and/or thermal stability of the PCD compact during operation.

In certain PCD compacts, catalyst material that is present in the interstitial volumes between the inter-bonded diamond grains may be removed. Removal of the catalyst material from the interstitial volumes may improve the performance characteristics of the PCD compact. However, removal of material from the interstitial volumes may exhibit an increased likelihood of re-infiltration of foreign substances into the interstitial volumes.

Accordingly, polycrystalline diamond compacts that reduce re-infiltration into the depleted interstitial volumes between bonded diamond grains may be desired.

SUMMARY

In one embodiment, a polycrystalline diamond compact includes a polycrystalline diamond body having a plurality of diamond grains bonded together in diamond-to-diamond bonds, interstitial volumes positioned between the adjacent diamond grains, and a parting compound positioned in at least a portion of the interstitial volumes of the polycrystalline diamond body.

In another embodiment, a polycrystalline diamond compact includes a polycrystalline diamond body having a plurality of diamond grains bonded together in diamond-to-diamond bonds, and interstitial volumes positioned between the adjacent diamond grains. The polycrystalline diamond body has a working surface, an attachment surface positioned distally from the working surface, a perimeter, and a thickness that measures from the working surface to an attachment surface. The polycrystalline diamond compact also includes a non-catalytic material positioned in at least a portion of the interstitial volumes of the polycrystalline body and a parting compound positioned in at least a portion of the interstitial volumes of the polycrystalline diamond body.

In yet another embodiment, a method of making a polycrystalline diamond includes subjecting a polycrystalline diamond body to a leaching operation in which catalytic material positioned in the interstitial volumes between diamond grains sintered in diamond-to-diamond bonds is removed. The method also includes applying a parting compound to external surfaces of the polycrystalline diamond body and allowing the parting compound to enter the interstitial volumes between the diamond grains, and removing the parting compound from the external surfaces of the polycrystalline diamond body.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
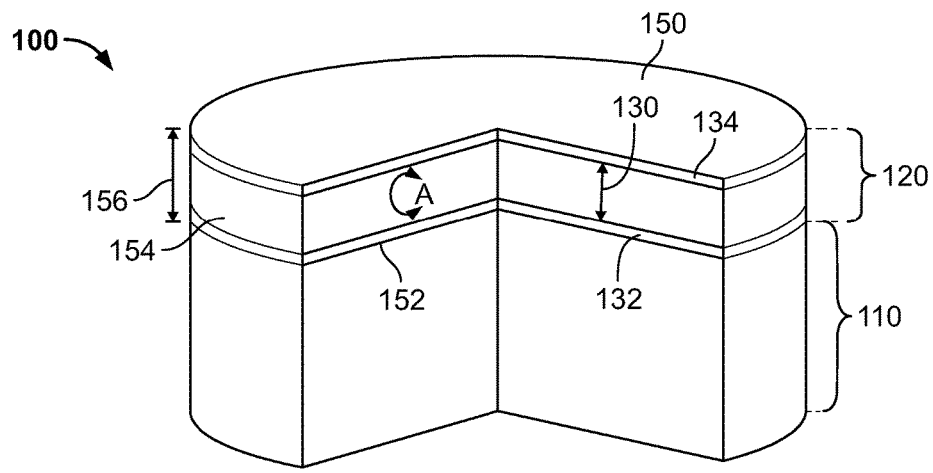
FIG. 1 is a schematic partial cutaway side view of a PCD compact according to one or more embodiments shown or described herein.

The present disclosure is directed to polycrystalline diamond compacts and polycrystalline diamond cutters incorporating the same. The polycrystalline diamond compacts include a polycrystalline diamond body having a plurality of diamond grains that are bonded together in diamond-to-diamond bonds, and interstitial volumes positioned between the adjacent diamond grains. The interstitial volumes may be at least partially depleted of material in the interstitial volumes, such that the interstitial volumes may subsequently be supplied with a parting compound. The parting compound may at least partially fill the interstitial volumes between the diamond grains. The parting compound may prevent the re-infiltration of foreign substances into the interstitial volumes. This may improve manufacturability of the assemblies into which the polycrystalline diamond compacts are subsequently installed. Polycrystalline diamond compacts, polycrystalline diamond cutters, and methods of making the same are described in greater detail below.

It is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the end user. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means plus or minus 10% of the numerical value of the number with which it is being used. Therefore, "about 40" means in the range of 36-44.

As used herein, the term "non-catalytic material" refers to an additive that is introduced to the polycrystalline diamond body, and that is not catalytic with carbon in forming diamond and inter-diamond grain bonds. Non-catalytic materials do not include hard-phase materials that may be introduced to the polycrystalline diamond body from the support substrate or reaction products that are formed in the polycrystalline diamond body during the HPHT processes.

Polycrystalline diamond compacts (or "PCD compacts", as used hereafter) may represent a volume of crystalline diamond grains with embedded foreign material filling the inter-granular spaces. In one example, a PCD compact includes a plurality of crystalline diamond grains that are bound to each other by strong inter-diamond bonds and forming a rigid polycrystalline diamond body, and the inter-granular volumes, disposed between the bound grains and filled with a non-diamond material (e.g., a catalytic material such as cobalt or its alloys), which was used to promote diamond bonding during fabrication of the PCD compact. Suitable metal solvent catalysts may include the metal in Group VIII of the Periodic table. PCD cutting elements (or "PCD cutter", as is used hereafter) include the above mentioned polycrystalline diamond body attached to a suitable support substrate (for example, cemented tungsten carbide-cobalt (WC—Co)). The attachment between the polycrystalline diamond body and the substrate may be made by virtue of the presence of a catalyst, for example cobalt metal. In another embodiment, the polycrystalline diamond body may be attached to the support substrate by brazing. In another embodiment, a PCD compact includes a plurality of crystalline diamond grains, which are not bound to each other, but instead are bound together by foreign bonding materials such as borides, nitrides, or carbides, for example, SiC.

As discussed above, conventional PCD compacts are used in a variety of industries and applications in material removal operations. PCD compacts are typically used in non-ferrous metal removal operations and in downhole drilling operations in the petroleum industry. Conventional PCD compacts exhibit high toughness, strength, and abrasion resistance because of the inter-granular inter-diamond bonding of the diamond grains that make up the polycrystalline diamond bodies of the PCD compacts. The inter-diamond bonding of the diamond grains of the polycrystalline diamond body are promoted during an HPHT process by a catalytic material. However, at elevated temperature, the catalytic material and its byproducts that remain present in the polycrystalline diamond body after the HPHT process may promote back-conversion of diamond to non-diamond carbon forms and may induce stress into the diamond lattice due to the mismatch in the coefficient of thermal expansion of the materials.

It is conventionally known to remove or deplete portions of the catalytic material to improve the thermal stability of the diamond body. The most common method of removing the catalytic material is a leaching process in which the PCD compact is introduced to a leaching medium, for example, an aqueous acid solution. The leaching medium may be selected from a variety of conventionally-known compositions in which the catalytic material is known to dissolve. By dissolving and removing at least a portion of the catalytic material from the PCD compact, the abrasion resistance of the PCD compact may be increased due to the reduction in back-conversion rate of the diamond in the polycrystalline diamond body to non-diamond carbon forms and the reduction in materials having mismatched coefficients of thermal expansion. However, a portion of catalytic material may still remain in the diamond body of the PCD compact that have been subjected to the leaching process. The interstitial volumes between diamond grains may form "trapped" or "entrained" volumes into which the leaching medium has limited or no accessibility. Therefore, these trapped volumes remain populated with the constituents of the PCD formation process. The trapped volumes that contain catalytic material contribute to the degradation of the abrasion resistance of the PCD compact at elevated temperature that is generated during use of the PCD compacts to remove material. Thus, reduction of trapped catalytic material may improve the abrasion resistance of PCD compacts.

In many end-user applications, the PCD compacts are introduced to subsequent manufacturing processes in which the PCD compacts are attached into assemblies. In one embodiment, the PCD compacts may be attached to an assembly in a brazing operation. In such brazing operations, portions of the PCD compacts may be positioned in a flux bath and held at elevated temperature. The flux cleans the PCD compact and prepares it for the brazing operation. However, in PCD compacts that have polycrystalline diamond bodies in which catalyst material is removed from the interstitial volumes between diamond grains, the flux in the flux bath may tend to enter the evacuated interstitial volumes between diamond grains. This flux, and any other compounds that it brings with it, may tend to foul or cause undesirable chemical reactions when the PCD compact is subjected to the brazing operation.

Embodiments according to the present disclosure include PCD compacts having polycrystalline diamond bodies in which at least a portion of the interstitial volumes between diamond grains are leached of catalytic material. The PCD compacts include a parting compound that is positioned in at least a portion of the interstitial volumes between the diamond grains. The parting compound may provide at least a partial barrier to limit the introduction of undesired compounds into the interstitial volumes between the diamond grains. By limiting the introduction of undesired compounds into the interstitial volumes, the likelihood of chemical reactions of those undesired compounds in subsequent manufacturing operations or in the end user applications can be minimized.

Further, the parting compound may minimize the introduction of braze alloy to the interstitial volumes of the PCD compact during a braze operation, for example, during a braze operation in which the PCD compact is attached to a drill bit. Braze alloy may have a coefficient of thermal expansion mismatch with the PCD compact and/or may be catalytic to the diamond grains, either of which may be detrimental to performance of the PCD compact, including being detrimental to the abrasion resistance performance of the PCD compact. Also, in certain end-user applications, the parting compound may minimize the introduction of end-user application materials, for example drilling mud and/or rock debris when the polycrystalline diamond bodies are used in down-hole drilling applications. By minimizing the introduction of undesired compounds in subsequent manufacturing operations or during end-user use, the performance of the PCD compact may be enhanced.

Figure 2:
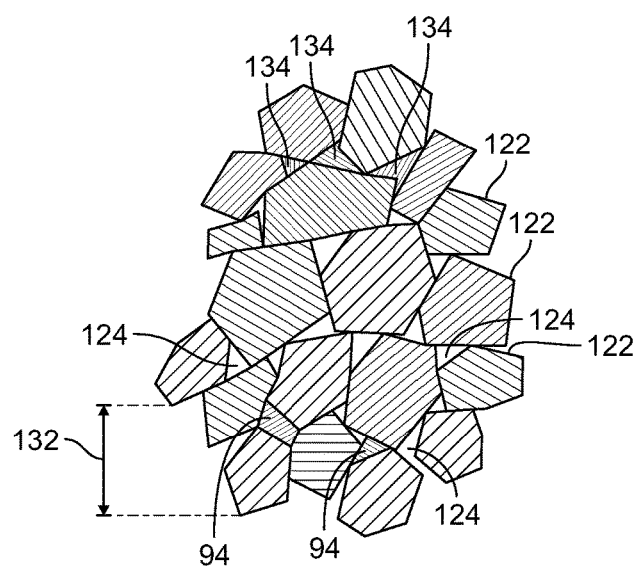
FIG. 2 is a detailed schematic side cross-sectional view of the PCD compact of FIG. 1 shown at location A.

Referring now to FIGS. 1 and 2, a PCD compact 100 is depicted. The PCD compact 100 includes an optional support substrate 110 and a polycrystalline diamond body 120 that is attached to the support substrate 110. The polycrystalline diamond body 120 includes a plurality of diamond grains 122 that are bonded to one another, including being bonded to one another through inter-diamond bonding. The bonded diamond grains 122 form a diamond lattice that extends along the polycrystalline diamond body 120. The diamond body 120 also includes a plurality of interstitial volumes 124 between the diamond grains. The interstitial volumes 124 represent a space between the diamond grains.

The polycrystalline diamond body 120 includes a working surface 150, an attachment surface 152 opposite the working surface 150, a perimeter 154, and a thickness 156 that measures from the working surface 150 to the attachment surface 152. In the depicted embodiment, the polycrystalline diamond body 120 is attached to the support substrate 110 along the attachment surface 152.

In embodiments of the PCD compacts 100 according to the present disclosure, the PCD compacts 100 are subjected to a material removal process that removes catalyst material and other non-diamond material from the interstitial volumes 124 between the diamond grains. The material removal process produces a PCD compact 100 that has a catalyst depleted region 130 in which accessible interstitial volumes 124 are substantially free of catalyst and other non-diamond material and a catalyst rich region 132 in which the catalyst and other non-diamond material remain. In the depicted embodiment, the catalyst depleted region 130 extends from the working surface 150 of the PCD compact into the polycrystalline diamond body 120 and towards the attachment surface 152.

These accessible interstitial volumes 124 in the catalyst depleted region 130 that are substantially free of catalyst and other non-diamond material may be prone to re-infiltration of materials during subsequent processing. To avoid re-infiltration of materials into the catalyst depleted region 130, at least some of the interstitial volumes 124 in the polycrystalline diamond body are at least partially filled with a parting material 134. The parting material 134 may provide an effective block to prevent re-infiltration of materials during subsequent processing. In the depicted embodiment, the parting material 134 is positioned in the interstitial volumes 124 that are positioned proximate to the working surface 150 of the PCD compact 100. The parting material 134 may include a variety of materials including, for example and without limitation, oxides, nitrides, silicides, carbides, or carbonitrides of yttrium, aluminum, titanium, magnesium, boron, silicon, titanium, or combinations thereof.

In some embodiments, the interstitial volumes 124 include a non-catalytic material. Examples of such non-catalytic material include, for example and without limitation, antimony, bismuth, copper, gallium, indium, lead, lithium, magnesium, tellurium, thallium, tin and alloys thereof.

Figure 3:
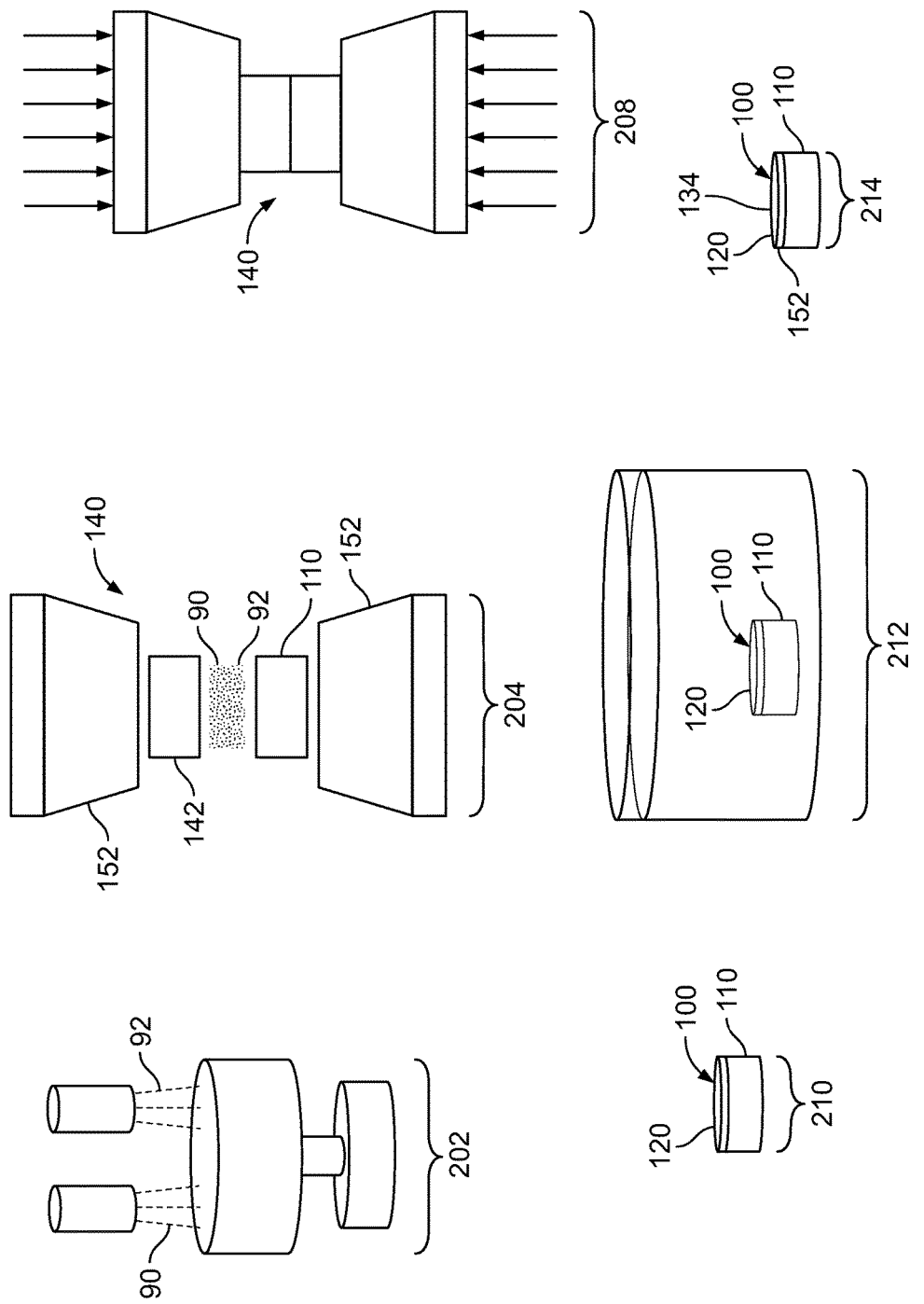
FIG. 3 is a schematic flow chart depicting a manufacturing process of a PCD compact according to one or more embodiments shown or described herein.

Referring now to FIG. 3, a flowchart depicted the manufacturing procedure 200 is provided. Diamond particles 90 are mixed with the non-catalytic material 92 in step 202. The size of the diamond particles 90 may be selected based on the desired mechanical properties of the polycrystalline diamond cutter that is finally produced. It is generally believed that a decrease in grain size increases the abrasion resistance of the polycrystalline diamond cutter, but decreases the toughness of the polycrystalline diamond cutter. Further, it is generally believed that a decrease in grain size results in an increase in interstitial volume of the PCD compact. The porosity represents the total accessible interstitial space of the polycrystalline diamond body. In one embodiment, the diamond particles 90 may have a single mode median volumetric particle size distribution (D50) in a range from about 10 µm to about 100 µm, for example having a D50 in a range from about 14 µm to about 50 µm, for example having a D50 of about 30 µm to about 32 µm. In other embodiments, the diamond particles 90 may have a D50 of about 14 µm, or about 17 µm, or about 30 µm, or about 32 µm. In other embodiments, the diamond particles 90 may have a multimodal particle size, wherein the diamond particles 90 are selected from two or more single mode populations having different values of D50, including multimodal distributions having two, three, or four different values of D50.

In one embodiment, a non-catalytic material 92 may be introduced to step 202 as a powder. In other embodiments, a non-catalytic material 92 may be coated onto the unbonded diamond particles. The particle size of the non-catalytic material may be in a range from about 0.005 µm to about 100 µm, for example being in a range from about 10 µm to about 50 µm.

The diamond particles 90 and the non-catalytic material 92 may be dry mixed with one another using, for example, a commercial TURBULA® Shaker-Mixer available from Glen Mills, Inc. of Cliftosn, N.J. or an acoustic mixer available from Resodyn Acoustic Mixers, Inc. of Butte, Mont. to provide a generally uniform and well mixed combination. In other embodiments, the mixing particles may be placed inside a bag or container and held under vacuum or in a protective atmosphere during the blending process.

In other embodiments, the diamond particles 90 and the non-catalytic material 92 may be added to a suitable solvent (for example, polyethylene glycol) to form a slurry. The slurry may be continuously mixed to provide an even distribution of the non-catalytic material 92 relative to the diamond particles 90. The solvent may be driven off from the diamond particles 90 and the non-catalytic material 92, for example by spray drying or evaporating in a rotary evaporator under reduced pressure. In some embodiments, the dried slurry results in a well-mixed dry powder of diamond particles 90 and non-catalytic material 92 that is free-flowing.

In other embodiments, the non-catalytic material 92 may be positioned separately from the diamond particles 90. During the first HPHT process, the non-catalytic materials 92 may "sweep" from their original location and through the diamond particles 90, thereby positioning the non-catalytic materials 92 prior to sintering of the diamond particles 90. Subsequent to sweeping of the non-catalytic materials 92, the catalytic material 94 may be swept through the diamond particles 90 during the first HPHT process, thereby promoting formation of inter-diamond bonds between the diamond particles 90 and sintering of the diamond particles 90 to form the polycrystalline diamond body 120 of the polycrystalline diamond compact 80.

The diamond particles 90 and the non-catalytic material 92 may be positioned within a low-reactivity cup 142 that is made of a refractory material, for example tantalum, niobium, vanadium, molybdenum, tungsten, or zirconium, as shown in step 204. The support substrate 110 is positioned along an open end of the cup 142 and is optionally welded to the cup 142 to form a cell assembly 140 that encloses diamond particles 90 and the non-catalytic material 92. The support substrate 110 may be selected from a variety of hard phase materials including, for example, cemented tungsten carbide, cemented tantalum carbide, or cemented titanium carbide. The support substrate 110 may include a predetermined quantity of catalytic material 94. Using a cemented tungsten carbide-cobalt system as an example, the cobalt is the catalytic material 94 that is infiltrated into the diamond particles 90 during the HPHT process. In other embodiments, the cell assembly 140 may include additional catalytic material (not shown) that is positioned between the support substrate 110 and the diamond particles 90. In further other embodiments, the cell assembly 140 may include non-catalytic material 92 that is positioned between the diamond particles 90 and the support substrate 110 or between the diamond particles 90 and the additional catalytic material (not shown).

The cell assembly 140, which includes the diamond particles 90, the non-catalytic material 92, and the support substrate 110, is introduced to a press that is capable of and adapted to introduce ultra-high pressures and elevated temperatures to the cell assembly 140 in an HPHT process, as shown in step 208. The press type may be a belt press, a cubic press, or other suitable presses. The pressures and temperatures of the HPHT process that are introduced to the cell assembly 140 are transferred to contents of the cell assembly 140. In particular, the HPHT process introduces pressure and temperature conditions to the diamond particles 90 at which diamond is stable and inter-diamond bonds form. The temperature of the HPHT process may be at least about 1000° C. (e.g., about 1200° C. to about 1800° C., or about 1300° C. to about 1600° C.) and the pressure of the HPHT process may be at least 4.0 GPa (e.g., about 5.0 GPa to about 10.0 GPa, or about 5.0 GPa to about 8.0 GPa) for a time sufficient for adjacent diamond particles 90 to bond to one another, thereby forming an integral PCD compact 100 having the polycrystalline diamond body 120 and the support substrate 110 that are bonded to one another.

Subsequent to formation of the integral PCD compact 100, the polycrystalline diamond body 120 and the substrate 110 may be processed using a variety of conventionally known techniques, including machining techniques, such as grinding, electrical discharge machining, or laser ablation, as shown in step 210. The PCD compact 100 may be shaped into a cylindrical shaped disc in which generally planar faces and a generally cylindrical body of the polycrystalline diamond body 120 are formed.

The introduction of the non-catalytic material to the polycrystalline diamond body 120 prior to the first HPHT process may result in a reduction of catalytic material that is present in the polycrystalline diamond body 120 following the HPHT process and prior to initiation of any subsequent leaching process. As compared to conventional cutters that are produced without the introduction of the non-catalytic material, unleached diamond bodies 120 produced according to the present disclosure may contain, for example, about 10% less catalytic material when evaluated prior to leaching.

The polycrystalline diamond body 120 may undergo a leaching process in which the catalytic material is removed from the interstitial volumes of the polycrystalline diamond body 120. In one example of a leaching process, the polycrystalline diamond body 120 is introduced to an acid bath, as shown in step 212. The leaching process may remove non-catalytic material and catalytic material from the interstitial volumes of the polycrystalline diamond body 120 that are accessible to the acid. Suitable acids may be selected based on the solubility of the non-catalytic material and the catalytic material that is present in the polycrystalline diamond body 120. Examples of such acids including, for example and without limitation, ferric chloride, cupric chloride, nitric acid, hydrochloric acid, hydrofluoric acid, aqua regia, or solutions or mixtures thereof. The acid bath may be maintained at an pre-selected temperature to modify the rate of removal of the non-catalytic material and the catalytic material from the polycrystalline diamond body 120, including being in a temperature range from about 10° C. to about 95° C. In some embodiments, the acid bath may be maintained at elevated pressures that increase the liquid boiling temperature and thus allow the use of elevated temperatures, for example being at a temperature of greater than about 110° C. The polycrystalline diamond body 120 may be subjected to the leaching process for a time sufficient to remove the desired quantity of non-catalytic material and catalytic material from the polycrystalline diamond body 120. The polycrystalline diamond body 120 may be subjected to the leaching process for a time that ranges from about one hour to about one month, including ranging from about one day to about 7 days In some embodiments, the polycrystalline diamond body 120 may be maintained in the leaching process until the interstitial volumes of the polycrystalline diamond body 120 are at least partially leached. In polycrystalline diamond bodies 120 that are partially leached, the interstitial volumes of the polycrystalline diamond bodies 120 that are positioned along the outer surfaces of the polycrystalline diamond bodies 120 are depleted of non-catalytic material 92 and/or catalytic material, while the interior regions of the polycrystalline diamond bodies 120 remain rich with non-catalytic material and/or catalytic material 94. In other embodiments, the polycrystalline diamond body 120 may be maintained in the acid bath until complete leaching of the polycrystalline diamond body 120 is realized. Complete leaching of the polycrystalline diamond body 120 may be defined as removal from the polycrystalline diamond body 120 of all of the non-catalytic material and the catalytic material 94 that is accessible to the leaching media.

The introduction of the non-catalytic material to the polycrystalline diamond body 120 reduces the concentration of the catalytic material in the polycrystalline diamond body 120 prior to leaching. The introduction of the non-catalytic material to the polycrystalline diamond body 120 also reduces the concentration of the catalytic material that remains present in the trapped interstitial volumes of the polycrystalline diamond body 120 following complete leaching of the polycrystalline diamond body 120. As compared to conventional cutters that are produced without the introduction of the non-catalytic material, diamond bodies 120 produced according to the present disclosure contain from about 30 vol. % to about 90 vol. % less catalytic material following complete leaching of both of the compared diamond bodies.

The introduction of the non-catalytic material 92 to the polycrystalline diamond body 120 may also increase the leaching rate of the polycrystalline diamond body 120, such that the duration of time required to obtain complete leaching of the polycrystalline diamond body 120 is reduced as compared to conventionally produced diamond bodies. For example, complete leaching of the polycrystalline diamond body 120 having non-catalytic material 92 according to the present disclosure may be obtained from about 30% to about 60% less time as compared to conventional cutters that are produced without the introduction of the non-catalytic material 92. In one example, when evaluated after 7 days of introduction to the leaching process, polycrystalline diamond bodies 120 produced according to the present disclosure exhibited from about 40% to about 70% more mass loss than conventional PCD compacts.

Following conclusion of the leaching process of the polycrystalline diamond body 120, the polycrystalline diamond body 120 continues to exhibit non-diamond components that are present in the trapped interstitial regions of the polycrystalline diamond body 120 that are positioned between bonded diamond grains in at least detectable amounts. However, the reduction of the non-diamond components (including catalytic material) in the leaching process accessible interstitial regions reduces the content of catalytic material in the polycrystalline diamond body 120 and increases the thermal stability of the polycrystalline diamond body 120.

In some embodiments, the interstitial volumes 124 may be primarily filled with catalytic material after the HPHT sintering process. In some embodiments, a non-catalytic material may be introduced to the polycrystalline diamond body before or during the HPHT sintering process. The non-catalytic materials may remain in the polycrystalline diamond body after recovery of the PCD compact 100 from the HPHT sintering process.

After the HPHT sintering process, in at least some of the interstitial volumes, a non-carbon material is present. In some embodiments and in some of the interstitial volumes, a non-catalytic material may be present. In other interstitial volumes, catalytic material may be present. In yet other interstitial volumes, both non-catalytic material and catalytic material may be present. In yet other interstitial volumes, at least one of catalytic material, non-catalytic material, swept material of the support substrate 110, for example, cemented tungsten carbide, and reaction by-products of the HPHT process are present. Non-carbon, non-catalytic or catalytic materials may be bonded to diamond grains. Alternatively, non-carbon, non-catalytic or catalytic materials may be not bonded to diamond grains.

The catalytic material may be a metallic catalyst, including metallic catalysts selected from Group VIII of the periodic table, for example, cobalt, nickel, iron, or alloys thereof. The catalytic material may be present in a greater concentration in the support substrate 110 than in the polycrystalline diamond body 120, and may promote attachment of the support substrate 110 to the polycrystalline diamond body 120 in the HPHT process, as will be discussed below. The polycrystalline diamond body 120 may include an attachment region 128 that is rich in catalyst material promotes bonding between the polycrystalline diamond body 120 and the support substrate 110. In other embodiments, the concentration of the catalytic material may be greater in the polycrystalline diamond body 120 than in the support substrate 110. In yet other embodiments, the catalytic material may differ from the catalyst of the support substrate 110. The catalytic material may be a metallic catalyst reaction-by-product, for example catalyst-carbon, catalyst-tungsten, catalyst-chromium, or other catalyst compounds, which also may have lower catalytic activity towards diamond than a metallic catalyst.

The non-catalytic material may be selected from a variety of materials that are non-catalytic with the carbon-diamond conversion and include, for example, metals, metal alloys, metalloids, semiconductors, and combinations thereof. The non-catalytic material may be selected from one of copper, silver, gold, aluminum, silicon, gallium, lead, tin, bismuth, indium, thallium, tellurium, antimony, polonium, and alloys thereof.

Both non-catalytic material and catalytic material may be present in a detectable amount in the polycrystalline diamond body of the PCD compact. Presence of such materials may be identified by X-ray fluorescence, for example using a XRF analyzer available from Bruker AXS, Inc. of Madison, Wis., USA. Presence of such material may also be identified using X-ray diffraction, energy dispersive spectroscopy, or other suitable techniques.

Subsequent to removal of the catalytic and non-catalytic materials from the interstitial volumes of the PCD compact 100, a parting compound 134 may be introduced into the now-vacant interstitial volumes, as depicted in step 214. In one embodiment, a parting compound 134 may be applied to the working surface 152 of the PCD compact 100 as a liquid. In some embodiments, the parting compound 134 may include a solid portion that includes oxides, nitrides, silicides, carbides, or carbonitrides of yttrium, aluminum, titanium, magnesium, boron, silicon, titanium, or combinations thereof. The parting compound 134 may include a water-based or a solvent-based carrier into which the solid portion is dissolved.

The parting compound 134 may be applied as a liquid or as a slurry to the PCD compact 100. For example and without limitation, the parting compound 134 may be applied with a physical applicator, sprayed onto the PCD compact 100, or the PCD compact 100 may be at least partially submerged into a volume of parting compound 134. The parting compound 134 may wick or otherwise be transferred into the interstitial volumes of the PCD compact 100, the carrier allowed to evaporate, and excess parting compound 134 removed from the exterior surfaces of the PCD compact 100. The parting compound 134, therefore, remains in the interstitial volumes 124 of the PCD compact.

Following fabrication of the PCD compact, the PCD compact may be secured into an assembly. The PCD compact may be brazed into the assembly. To prepare the PCD compact for the braze operation, the PCD compact may be subjected to a chemical purifying agent, for example, by introducing the PCD compact to a chemical flux. When the PCD compact is subjected to the braze operation, the chemical flux may tend to become liquid and flow into the interstitial volumes of the polycrystalline diamond body from which catalytic and non-catalytic materials were removed in the leaching operation. The compounds of the chemical flux may tend to undergo undesirable chemical reactions during the braze operation. To reduce the likelihood of such undesirable chemical reactions, the parting compound may block the chemical flux from entering the interstitial volumes. Therefore, the parting compound reduces the likelihood of undesirable chemical reactions of the chemical flux during a subsequent braze operation.

It should now be understood that PCD compacts according to the present disclosure include a polycrystalline diamond body having interstitial volumes that are at least partially leached of catalytic material and a parting compound that is positioned in at least a portion of the interstitial volumes. The parting compound reduces the availability of the interstitial volumes to accept undesired compounds into the interstitial volumes. By limiting the introduction of undesired compounds into the interstitial volumes, the likelihood of chemical reactions of those undesired compounds in subsequent manufacturing operations or in the end user applications can be minimized.

The invention claimed is:

1. A method of making a polycrystalline diamond compact, comprising:

subjecting a polycrystalline diamond body to a leaching operation in which catalytic material positioned in the interstitial volumes between diamond grains sintered in diamond-to-diamond bonds is removed;

applying a parting compound to external surfaces of the polycrystalline diamond body and allowing the parting compound to enter the interstitial volumes between the diamond grains, wherein the parting compound is removed from the external surfaces of the polycrystalline diamond body in an abrasive blasting operation; and removing the parting compound from the external surfaces of the polycrystalline diamond body.

2. The method of claim 1, wherein the parting compound comprises yttria oxide, aluminum oxide, titanium oxide, magnesium oxide, boron nitride, silicon carbide, titanium silicide, or combinations thereof.

3. The method of claim 1, wherein the parting compound comprises a water-based parting compound, a solvent-based parting compound, or combinations thereof.

4. The method of claim 1, wherein:

the polycrystalline diamond body comprises a working surface, an attachment surface positioned distally from the working surface, a perimeter, and a thickness that measures from the working surface to an attachment surface, and the parting compound is applied to the polycrystalline body along the working surface.

5. The method of claim 4, wherein the parting compound is further applied to the polycrystalline body along at least a portion of the perimeter and any surface bridging the perimeter and the working surface.

* * * * *